(12) United States Patent
Yasuda et al.

(10) Patent No.: US 7,692,415 B2
(45) Date of Patent: Apr. 6, 2010

(54) REACTIVE POWER CONTROL APPARATUS FOR AC POWER SYSTEM

(75) Inventors: Satoshi Yasuda, Tokyo (JP); Masatoshi Takeda, Tokyo (JP); Hitoshi Teramoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 272 days.

(21) Appl. No.: 11/797,077

(22) Filed: Apr. 30, 2007

(65) Prior Publication Data
US 2008/0150496 A1 Jun. 26, 2008

(30) Foreign Application Priority Data
Dec. 25, 2006 (JP) .............................. 2006-347229

(51) Int. Cl.
*G05F 1/70* (2006.01)
(52) U.S. Cl. ...................................... 323/210; 307/105
(58) Field of Classification Search ............. 363/34–39, 363/95, 71, 72, 132; 323/209–211, 20, 24, 323/51; 307/46, 64–6, 105
See application file for complete search history.

(56) References Cited

U.S. PATENT DOCUMENTS
4,857,821 A * 8/1989 Takeda ........................ 323/210
4,941,079 A * 7/1990 Ooi ............................. 363/132

FOREIGN PATENT DOCUMENTS
JP 62-269213 A 11/1987

* cited by examiner

*Primary Examiner*—Rajnikant B Patel
(74) *Attorney, Agent, or Firm*—Buchanan Ingersoll & Rooney PC (57) ABSTRACT

A reactive power control apparatus for an AC power system includes a reactive power compensation device, a compensation capacitor device and a compensation capacitor control device. The compensation capacitor control device includes a detection voltage output circuit which outputs a bus detection voltage after the clearing of a voltage drop abnormality, corresponding to the AC voltage of a system bus after the voltage drop abnormality that occurred in the AC power system has been cleared, and a compensation capacitor control circuit which controls the connection status of a compensation capacitor with respect to the system bus. The compensation capacitor control circuit controls the connection status of the compensation capacitor with respect to the system bus, on the basis of the voltage level of the bus detection voltage after the clearing of the voltage drop abnormality.

10 Claims, 5 Drawing Sheets

CLOSING CONDITION AND OPENING CONDITION OF COMPENSATION
CAPACITOR 41 WITH RESPECT TO SYSTEM BUS 11

|  |  | BUS DETECTION VOLTAGE VSR AFTER CLEARING ABNORMALITY | CONNECTION STATUS OF COMPENSATION CAPACITOR 41 |
|---|---|---|---|
| (a) | CLOSING CONDITION | $VSR < VL$ | CLOSED |
| (b) | OPENING CONDITION | $VSR \geq VH$ | OPEN |

CLOSING CONDITIONS AND OPENING CONDITIONS OF COMPENSATION
CAPACITORS 41A AND 41B WITH RESPECT TO SYSTEM BUS 11

|  |  | BUS DETECTION VOLTAGE VSR AFTER CLEARING ABNORMALITY | CONNECTION STATUSES OF COMPENSATION CAPACITORS 41A AND 41B | |
|---|---|---|---|---|
|  |  |  | COMPENSATION CAPACITOR 41A | COMPENSATION CAPACITOR 41B |
| (a) | CLOSING CONDITIONS | $VL2 \leqq VSR < VL1$ | CLOSED | — |
|  |  | $VSR < VL2 < VL1$ | CLOSED | CLOSED |
| (b) | OPENING CONDITIONS | $VH2 < VH1 \leqq VSR$ | OPEN | OPEN |
|  |  | $VH2 \leqq VSR < VH1$ | — | OPEN |

REACTIVE POWER CONTROL APPARATUS FOR AC POWER SYSTEM

BACKGROUND OF THE INVENTION

1. Field of the Invention

This invention relates to a reactive power control apparatus for an AC power system, in which a reactive power compensation device, and a compensation capacitor device including at least one compensation capacitor are connected to the system bus of the AC power system, so as to control reactive power in accordance with the voltage fluctuation of the system bus.

2. Description of the Related Art

Patent Document 1 (JP-A-62-269213, particularly FIG. 1) discloses a reactive power control apparatus which employs a reactive power compensation device and a compensation capacitor device in combination. The reactive power compensation device and the compensation capacitor device are connected to the identical system bus of an AC power system. The reactive power compensation device includes a capacitor, a reactor and a semiconductor switch, and it controls the semiconductor switch in accordance with the reactive power of the system bus, so as to compensate the reactive power of the system bus. The compensation capacitor device includes a plurality of compensation capacitors. The individual compensation capacitors are respectively connected to the system bus through switch devices, and they are closed to or opened from the system bus by turning ON/OFF the corresponding switch devices.

The reactive power control apparatus disclosed in Patent Document 1 performs the control of compensating the reactive power which a load consumes during a load fluctuation, by the reactive power compensation device and the compensation capacitor device which are connected to the system bus in parallel with the fluctuating load. The control, however, does not cope with a transient mode at a recovery stage from the abnormal state of the power system. The reactive power compensation device is configured so as to control the reactive power in a wider range than the capacitances of the respective compensation capacitors in the compensation capacitor device. In a case where the abnormal state has occurred in the power system, the reactive power compensation device outputs much reactive power instantaneously, and the respective compensation capacitors of the compensation capacitor device are thereafter closed to the system bus in succession. When the power system has recovered from the abnormal state, a control proceeds so that the reactive power compensation device may absorb surplus reactive power instantaneously, and that the respective compensation capacitors having been closed may be thereafter opened from the system bus. Therefore, the reactive power control apparatus has the problem that the capacity of the reactive power compensation device becomes large.

SUMMARY OF THE INVENTION

This invention has its object to provide an improved reactive power control apparatus for an AC power system as can solve such a problem.

A reactive power control apparatus for an AC power system according to this invention, wherein a reactive power compensation device, and a compensation capacitor device including at least one compensation capacitor are connected to a system bus of the AC power system, and reactive power is controlled in accordance with a fluctuation of an AC voltage of the system bus. The reactive power control apparatus includes a compensation capacitor control device which controls a connection status of the compensation capacitor with respect to the system bus. The compensation capacitor control device includes bus detection voltage output means for outputting a bus detection voltage after clearing of a voltage drop abnormality as corresponds to the AC voltage of the system bus after the voltage drop abnormality that occurred in the AC power system has been cleared. The compensation capacitor control device further includes a compensation capacitor control circuit controls the connection status of the compensation capacitor with respect to the system bus. The compensation capacitor control circuit controls the connection status of the compensation capacitor with respect to the system bus, on the basis of a voltage level of the bus detection voltage after the clearing of the voltage drop abnormality.

With the reactive power control apparatus for the AC power system according to this invention, owing to the above configuration and operation, the closure and opening of the compensation capacitor to and from the system bus are controlled on the basis of the voltage level of the bus detection voltage after the clearing of the voltage drop abnormality, after the voltage drop abnormality that occurred in the AC power system has been cleared. Accordingly, the reactive power control apparatus for the AC power system can make the capacity of the reactive power compensation device small.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Now, several embodiments of a reactive power control apparatus for an AC power system according to this invention will be described with reference to the drawings.

Embodiment 1

Figure 1:
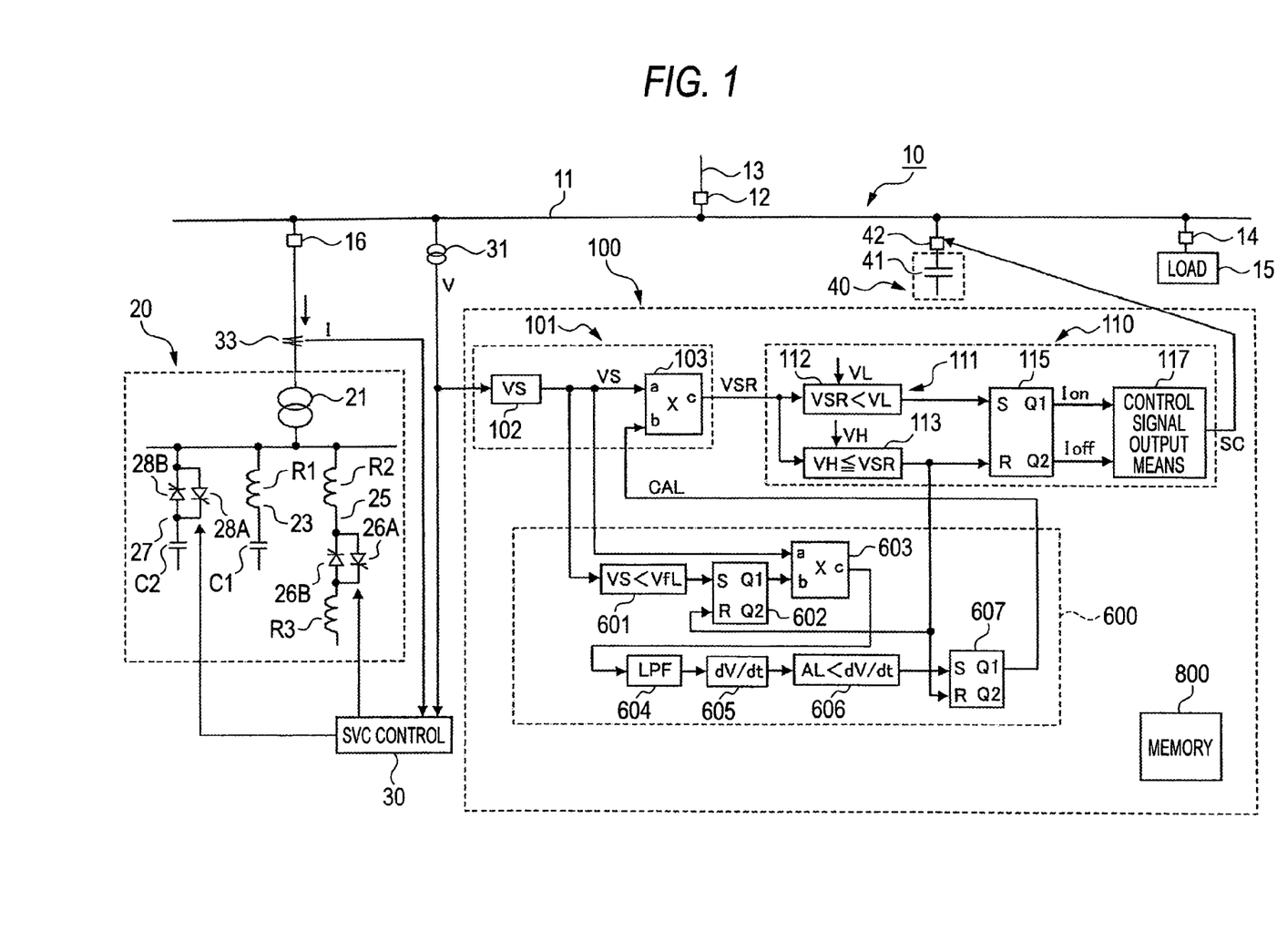
FIG. 1 is a configurational diagram showing Embodiment 1 of a reactive power control apparatus for an AC power system according to this invention.

FIG. 1 is a configurational diagram showing Embodiment 1 of a reactive power control apparatus for an AC power system according to this invention.

The reactive power control apparatus for the AC power system in Embodiment 1 includes the AC power system 10, a reactive power compensation device 20, a reactive power compensation control device 30, a compensation capacitor device 40 and a compensation capacitor control device 100. The AC power system 10 includes a system bus 11, which is connected to a host system 13 through a circuit breaker 12. A load 15 is connected to the system bus 11 through a circuit breaker 14. The reactive power compensation device 20 is connected to the system bus 11 in parallel with the load 15, through a circuit breaker 16. The compensation capacitor device 40 is connected to the system bus 11 in parallel with the load 15, through a switch device 42.

A steady state and an abnormal state exist in the AC power system 10. In the steady state, the AC voltage v of the system bus 11 is held within a steady voltage range, whereas in the abnormal state, the AC voltage v of the system bus 11 falls outside the steady voltage range. The abnormal state contains a voltage drop abnormality, and a voltage rise abnormality in a recovery process after the voltage drop abnormality has been cleared. The voltage drop abnormality is an abnormality in which the AC voltage v of the system bus 11 lowers into a region smaller than the steady voltage range, and which occurs in, for example, a line-to-ground fault or an overload state. On the other hand, the voltage rise abnormality is an abnormality in which the AC voltage v of the system bus 11 rises into a region larger than the steady voltage range, and which occurs in the recovery process after the clearing of the voltage drop abnormality. The voltage drop abnormality is cleared in such a way that the protective circuit of the AC power system 10, not shown, detects the abnormality, whereupon a countermeasure for clearing the abnormality, such as opening a circuit breaker not shown, is carried out.

The reactive power compensation device 20 is constructed as a static type reactive power compensation device which is generally called "SVC (Static Var Compensator)". This reactive power compensation device 20 includes a voltage transformer 21, a filter circuit 23, a control reactor circuit 25 and a control capacitor circuit 27, and the voltage transformer 21 is connected to the system bus 11 in parallel with the load 15, through the circuit breaker 16. Although each of the filter circuit 23, control reactor circuit 25 and control capacitor circuit 27 is illustrated as only one circuit, a required number of such circuits are connected in parallel with each other/one another.

The filter circuit 23 is constructed by connecting a reactor R1 and a capacitor C1 in series. The control reactor circuit 25 includes reactors R2 and R3, and a pair of semiconductor switches 26A and 26B, and the pair of semiconductor switches 26A and 26B are respectively connected in series with the reactors R2 and R3. The pair of semiconductor switches 26A and 26B are connected in parallel and in polarities opposite to each other, thereby to control the reactive power. The control capacitor circuit 27 includes a capacitor C2, and a pair of semiconductor switches 28A and 28B, and the pair of semiconductor switches 28A and 28B are respectively connected in series with the capacitor C2. The pair of semiconductor switches 28A and 28B are connected in parallel and in polarities opposite to each other, thereby to control the reactive power. The individual semiconductor switches 26A, 26B, 28A and 28B are constructed by using, for example, thyristors, and the ON phases of the respective semiconductor switches can be successively controlled by controlling the ignition phases of the gates of the respective semiconductor switches.

The reactive power compensation control apparatus 30 controls the gates of the individual semiconductor switches 26A, 26B, 28A and 28B, thereby to control the ON phases of the respective semiconductor switches 26A, 26B, 28A and 28B. This reactive power compensation control apparatus 30 is connected to the system bus 11 through a power transformer (PT) 31, and is fed with a voltage signal V representative of the AC voltage v of the system bus 11, from the power transformer 31. Besides, the reactive power compensation control apparatus 30 is connected to a current transformer (CT) 33 which is joined to an electric path connecting the circuit breaker 16 and the voltage transformer 21, and it is fed with a current signal I representative of the AC current i of the system bus 11, from the current transformer 33. The reactive power compensation control apparatus 30 calculates the reactive power at the system bus 11 on the basis of the voltage signal V and the current signal I, and it controls the ON phases of the semiconductor switches 26A, 26B, 28A and 28B so as to feed reactive power corresponding to the calculated reactive power. This reactive power compensation control apparatus 30 is constructed by using, for example, a computer.

The compensation capacitor device 40 includes only one compensation capacitor 41 in this embodiment 1. The compensation capacitor 41 is connected to the system bus 11 in parallel with the load 15, through the switch device 42. Typically, the switch device 42 is constructed by using a mechanical circuit breaker which has a switch contact. The mechanical circuit breaker can be constructed less expensively as compared with a semiconductor switch. The mechanical circuit breaker constructing the switch device 42 has its switch contact turned ON and OFF, thereby to close and open the compensation capacitor 41 to and from the system bus 11, respectively. Incidentally, the switch device 42 can also be constructed by using the semiconductor switch, for example, a thyristor.

The compensation capacitor control device 100 turns ON and OFF the switch device 42, thereby to control the closure and opening of the compensation capacitor 41 to and from the system bus 11. This compensation capacitor control device 100 includes bus detection voltage output means 101, a compensation capacitor control circuit 110, a voltage drop abnormality clearing detection circuit 600 and a memory 800. Together with the reactive power compensation control device 30, the compensation capacitor control device 100 is constructed by using the computer. The memory 800 is a memory which is built in the computer.

The bus detection voltage output means 101 includes bus voltage detection means 102 and multiplication means 103, and it outputs a bus detection voltage VSR after the clearing of the voltage drop abnormality, from the multiplication means 103. The bus detection voltage VSR after the clearing of the voltage drop abnormality is proportional to the AC voltage v of the system bus 11 as is exhibited after the voltage drop abnormality having had occurred in the AC power system 10 has been cleared. The bus voltage detection means 102 receives the voltage signal V outputted from the power transformer 31, and outputs a bus detection voltage VS. The bus detection voltage VS has a magnitude proportional to the AC voltage v of the system bus 11.

The multiplication means 103 has a first input a, a second input b and an output c. The first input a of the multiplication means 103 is fed with the bus detection voltage VS. The second input b is fed with a voltage drop abnormality clearing signal CAL from the voltage drop abnormality clearing decision circuit 600. The voltage drop abnormality clearing signal CAL assumes a level "0" in a case where the AC power system 10 is in the steady state, and in the state where the voltage drop abnormality has occurred in the AC power system 10. In contrast, the clearing signal CAL assumes a level "1" when the clearing of the voltage drop abnormality state is decided by the voltage drop abnormality clearing decision circuit 600. If the voltage drop abnormality clearing signal CAL is at the level "0" the output c of the multiplication means 103 becomes the "0" level. When the voltage drop abnormality clearing signal CAL has become "1", the bus detection voltage VSR after the clearing of the voltage drop abnormality is outputted at the output c of the multiplication means 103. The bus detection voltage VSR after the clearing of the voltage drop abnormality is equal to the bus detection voltage VS exhibited after the clearing of the voltage drop abnormality, and it has a magnitude which is proportional to the AC voltage v of the system bus 11 as is exhibited after the clearing of the voltage drop abnormality. This bus detection voltage VSR after the clearing of the voltage drop abnormality is also proportional to the rise component of the AC voltage v of the system bus 11 as coexists with the voltage rise abnormality in the recovery process from the voltage drop abnormality.

The compensation capacitor control circuit 110 includes a comparison circuit 111, a flip-flop 115 and control signal output means 117. The comparison circuit 111 includes first and second comparison means 112 and 113. Both the inputs of the first and second comparison means 112 and 113 are connected to the output c of the multiplication means 103 of the bus detection voltage output means 101, so that the first and second comparison means 112 and 113 are fed with the bus detection voltage VSR after the clearing of the voltage drop abnormality. A threshold value VL is set in the first comparison means 112, and this first comparison means 112 makes the comparison between the bus detection voltage VSR after the clearing of the voltage drop abnormality and the threshold value VL. If the bus detection voltage VSR after the clearing of the voltage drop abnormality is less than the threshold value VL, that is, VSR<VL holds, then the first comparison means 112 generates a high level output. On the other hand, if the bus detection voltage VSR after the clearing of the voltage drop abnormality is equal to or greater than the threshold value VL, that is, VSR≧VL holds, then the output of the first comparison means 112 becomes a low level. Besides, a threshold value VH (VH>VL) is set in the second comparison means 113, and this second comparison means 113 makes the comparison between the bus detection voltage VSR after the clearing of the voltage drop abnormality and the threshold value VH. If the bus detection voltage VSR after the clearing of the voltage drop abnormality is equal to or greater than the threshold value VH, that is, VSR≧VH holds, then the second comparison means 113 generates a high level output. On the other hand, if the bus detection voltage VSR after the clearing of the voltage drop abnormality is less than the threshold value VH, that is, VSR<VH holds, then the output of the second comparison means 113 becomes the low level. The threshold values VL and VH are stored in the memory 800, and they are respectively set in the first and second comparison means 112 and 113 from the memory 800.

The flip-flop 115 has a set input S, a reset input R, and a pair of outputs Q1 and Q2. The set input S is connected to the output of the first comparison means 112, while the reset input R is connected to the output of the second comparison means 113. The flip-flop 115 falls into a set status when the set input S has become a high level. In the set status, the output Q1 becomes the high level, and the output Q2 becomes a low level. Besides, when the reset input R has become the high level, the flip-flop 115 falls into a reset status. In the reset status, the output Q1 becomes the low level, and the output Q2 becomes the high level. By the way, in an initial status, the flip-flop 115 is held in the reset status.

The output Q1 of the flip-flop 115 becomes a closing command "Ion" for the compensation capacitor 41, and the closing command Ion becomes a high level when the flip-flop 115 has fallen into the set status. The output Q2 of the flip-flop 115 becomes an opening command "Ioff" for the compensation capacitor 41, and the opening command Ioff becomes the high level when the flip-flop 115 has fallen into the reset status.

The control signal output means 117 generates a control signal SC for the switch device 42, on the basis of the closing command Ion and the opening command Ioff, so as to control the connection status of the compensation capacitor 41 with respect to the system bus 11. When the closing command Ion has become the high level, the control signal SC turns ON the switch device 42, thereby to close the compensation capacitor 41 to the system bus 11. Besides, when the opening command Ioff has become the high level, the control signal SC turns OFF the switch device 42, thereby to open the compensation capacitor 41 from the system bus 11.

The voltage drop abnormality clearing decision circuit 600 decides if the voltage drop abnormality state of the AC power system 10 has been cleared, on the basis of the bus detection signal VS, and it sets the voltage drop abnormality clearing signal CAL at the level "1" when the abnormality has been cleared. This voltage drop abnormality clearing decision circuit 600 includes voltage comparison means 601, a flip-flop 602, multiplication means 603, low-pass filter means 604, voltage gradient detection means 605, voltage gradient comparison means 606 and a flip-flop 607. The voltage drop abnormality clearing signal CAL is outputted from the output Q1 of the flip-flop 607.

The voltage comparison means 601 receives the bus detection voltage VS from the bus voltage detection means 102, and it compares the bus detection voltage VS with a threshold value VfL corresponding to the voltage drop abnormality. The threshold value VfL is set at a level for detecting that the voltage drop abnormality has occurred in the AC power system 10. When the bus detection voltage VS is less than the threshold value VfL, that is, VS<VfL holds, the voltage comparison means 601 detects the occurrence of the voltage drop abnormality in the AC power system 10 and generates a high level output.

The flip-flop 602 has a set input S, a reset input R, and a pair of outputs Q1 and Q2. The set input S of the flip-flop 602 is connected to the output of the voltage comparison means 601, and the reset input R thereof is connected to the output of the second comparison means 113. When the output of the voltage comparison means 601 has become a high level, the flip-flop 602 falls into a set status, and the output Q1 thereof becomes the high level, namely, the level "1". Besides, when the output of the second comparison means 113 has become the high level, the flip-flop 602 falls into a reset status, and the output Q1 thereof becomes a low level, namely, the level "0".

The multiplication means 603 has a first input a, a second input b and an output c. The first input a of the multiplication means 603 is fed with the bus detection voltage VS from the bus voltage detection means 102. The second input b of the multiplication means 603 is fed with the output Q1 of the flip-flop 602. This output Q1 of the flip-flop 602 becomes the level "1" when the voltage comparison means 601 has detected the voltage drop abnormality to bring its output to the high level. Therefore, in the case where the voltage drop abnormality state has occurred, the multiplication means 603 generates the bus detection voltage VS at its output c. In contrast, when the voltage drop abnormality does not occur, the output Q1 of the flip-flop 602 becomes the level "0", and hence, the output c of the multiplication means 603 becomes "0".

In the case where the voltage drop abnormality state has occurred, the low-pass filter 604 passes the fundamental frequency signal of the bus detection voltage VS generated at the output c of the multiplication means 603 and removes harmonic frequency components contained in the bus detection voltage VS. The voltage gradient detection means 605 detects the gradient dVS/dt of that fundamental frequency signal of the bus detection voltage VS which has been passed through the low-pass filter 604. The gradient dVS/dt is the differential output of the fundamental frequency signal of the bus detection voltage VS, and it is proportional to the change of the amplitude of the bus detection voltage VS. Concretely, if the amplitude of the bus detection voltage VS is decreasing simultaneously with the voltage drop abnormality, the gradient dVS/dt which is outputted from the voltage gradient detection means 605 is small. However, if the amplitude of the AC voltage v of the system bus 11 increases abruptly toward the steady voltage range, owing to the clearing of the voltage drop abnormality, the gradient dVS/dt which is outputted from the voltage gradient detection means 605 increases correspondingly.

The voltage gradient comparison means 606 compares that gradient dVS/dt of the bus detection voltage VS which is outputted from the voltage gradient detection means 605, with an abnormality clearing threshold value AL. The abnormality clearing threshold value AL is set at a value with which the voltage drop abnormality can be decided to have been cleared, when the amplitude of the bus detection voltage VS having lowered on account of the voltage drop abnormality increases abruptly at the clearing of the abnormality. When the gradient dVS/dt has enlarged to establish (dVS/dt)>AL, the voltage gradient comparison means 606 decides that the voltage drop abnormality has been cleared, and its output becomes a high level.

The flip-flop 607 has a set input S, a reset input R, and a pair of outputs Q1 and Q2. The set input S of the flip-flop 607 is connected to the output of the voltage gradient comparison means 606, and the reset input R thereof is connected to the output of the second comparison means 113. When the output of the voltage gradient comparison means 606 has become the high level, the flip-flop 607 falls into a set status, and the voltage drop abnormality clearing signal CAL which is outputted from the output Q1 of this flip-flop 607 becomes the high level, namely, the level "1". On the other hand, when VSR≧VH has held to bring the output of the second comparison means 113 to the high level, the flip-flop 607 falls into a reset status, and the voltage drop abnormality clearing signal CAL becomes the level "0". The voltage drop abnormality clearing signal CAL from the flip-flop 607 is fed to the second input b of the multiplication means 103 of the bus detection voltage output means 101.

Figure 2:
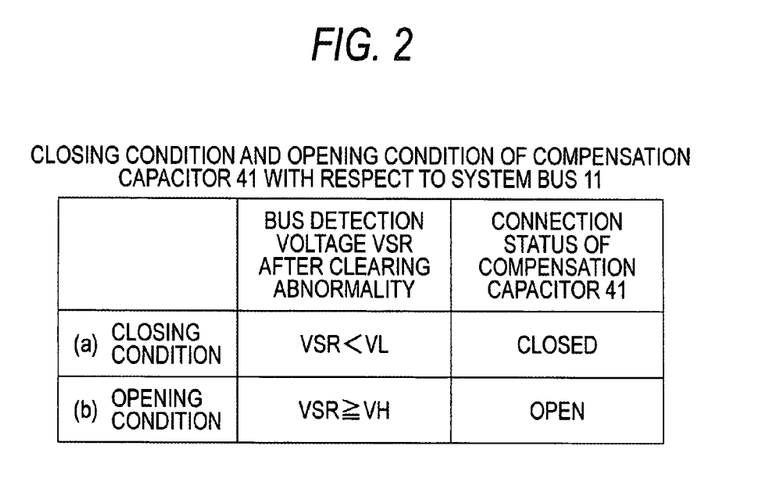
FIG. 2 is a table for explaining the operation of Embodiment 1, showing the closing condition and opening condition of a compensation capacitor with respect to a system bus.

Now, FIG. 2 is a table for explaining the operation of Embodiment 1, showing the closing condition and opening condition of the compensation capacitor 41 with respect to the system bus 11. (a) in FIG. 2 indicates the closing condition of the compensation capacitor 41, while (b) in FIG. 2 indicates the opening condition thereof.

Regarding the case where the voltage drop abnormality of the AC power system 10 has been cleared, when the initial voltage level of the bus detection voltage VSR after the clearing of the voltage drop abnormality is less than the threshold value VL, that is, VSR<VL holds, as indicated at (a) in FIG. 2, the flip-flop 115 is forcibly brought into the set status, and the compensation capacitor 41 is closed to the system bus 11.

Figure 3:
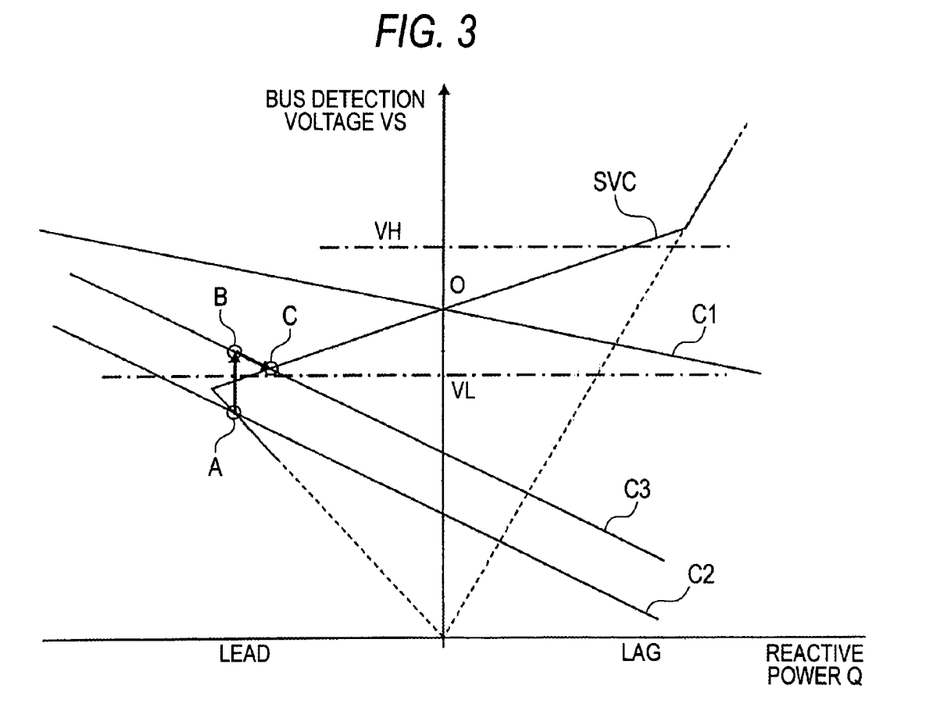
FIG. 3 is a diagram for explaining the operation of Embodiment 1 as employs the voltage versus reactive power characteristic of a reactive power compensation device in the case where the voltage drop abnormality of the AC power system has occurred.

The initial voltage level of the bus detection voltage VSR after the clearing of the voltage drop abnormality is equal to the bus detection voltage VS at the time when the voltage drop abnormality clearing signal CAL has changed from the level "0" to the level "1". When the voltage level of the bus detection voltage VSR after the clearing of the voltage drop abnormality is less than the threshold value VL of the first comparison means 112, the output of this first comparison means 112 becomes the high level, and the flip-flop 115 is forcibly brought into the set status, to bring the closing command Ion to the high level. Therefore, the compensation capacitor 41 is closed to the system bus 11, to raise the AC voltage v of the system bus 11 and to heighten the operating point of the reactive power compensation device 20 above the threshold value VL, whereby the AC voltage v of the system bus 11 is stabilized. FIG. 3 is a characteristic diagram showing the relationship between the bus detection voltage VS corresponding to the voltage drop abnormality and the reactive power Q of the system bus 11.

In FIG. 3, the axis of ordinates represents the bus detection voltage VS, and the threshold value VL which is set in the first comparison means 112, and the threshold value VH which is set in the second comparison means 113 are indicated so as to intersect the axis of ordinates orthogonally. The axis of abscissas represents the reactive power Q, and the left side of the axis of ordinates indicates leading reactive power, while the right side of the axis of ordinates indicates lagging reactive power. A characteristic SVC in FIG. 3 is the characteristic of the bus detection voltage VS and the reactive power Q based on the reactive power compensation device 20, a characteristic C1 is the characteristic of the bus detection voltage VS of the AC power system 10 and the reactive power Q corresponding thereto, in the steady state where the AC power system 10 is sound, and a characteristic C2 is the characteristic of the bus detection voltage VS of the AC power system 10 and the reactive power Q corresponding thereto, in the abnormal state where the voltage drop abnormality of the AC power system 10 has occurred.

If the reactive power compensation device 20 is connected to the system bus 11, and the AC power system 10 is in the steady state, then the reactive power compensation device 20 operates at an operating point O. The operating point O is the intersection point between the characteristic SVC and the characteristic C1, and it lies on the axis of ordinates at a position which is just intermediate between the threshold value VL and the threshold value VH. Let's assume a case where the voltage drop abnormality has occurred in the AC power system 10, and where the reactive power characteristic of the AC power system 10 has changed from the characteristic C1 to the characteristic C2. In this case, the operating point of the reactive power compensation device 20 shifts from the operating point O to an operating point A. The operating point A is the intersection point between the characteristic SVC and the characteristic C2, and the bus detection voltage VS at the operating point A is less than the threshold value VL. When the voltage drop abnormality of the AC power system 10 is cleared, the voltage drop abnormality clearing signal CAL of the output Q1 of the flip-flop 607 becomes the level "1", and the bus detection voltage VSR after the clearing of the voltage drop abnormality is outputted from the multiplication means 103. The initial voltage level of the bus detection voltage VSR after the clearing of the voltage drop abnormality, corresponding to the operating point A, is less than the threshold value VL which is set in the first comparison means 112. Therefore, the output of the first comparison means 112 becomes the high level, the flip-flop 115 is forcibly brought into the set status to bring its output Q1 to the high level, and the closing command Ion becomes the high level to turn ON the switch device 42, whereby the compensation capacitor 41 is closed to the system bus 11.

Owing to the closure of the compensation capacitor 41 to the system bus 11, the bus detection voltage VS of the system bus 11 rises to a point B, and the reactive power characteristic of the AC power system 10 changes from the characteristic C2 to a characteristic C3. Therefore, the operating point of the reactive power compensation device 20 shifts from the operating point A to an operating point C. The operating point C is the intersection point between the characteristic SVC and the characteristic C3, and the bus detection voltage VS of the operating point C is greater than the threshold value VL and less than the threshold value VH. In this manner, in the case where the voltage drop abnormality has occurred in the AC power system 10, the characteristic SVC of the reactive power compensation device 20 and the threshold value VL are caused to collaborate, and the compensation capacitor 41 is closed to the system bus 11, whereby the bus detection voltage VS of the system bus 11 is controlled to a value which is between the threshold value VL and the threshold value VH.

By the way, in the steady state where the voltage drop abnormality does not occur, the flip-flop 607 maintains the reset status, the bus detection voltage VSR after the clearing of the voltage drop abnormality maintains the zero level, and the flip-flop 115 maintains the reset status. In the reset status of the flip-flop 115, the output Q1 of this flip-flop 115 becomes the low level, and the output Q2 thereof becomes the high level, whereby the compensation capacitor 41 keeps its status opened from the system bus 11.

Figure 4:
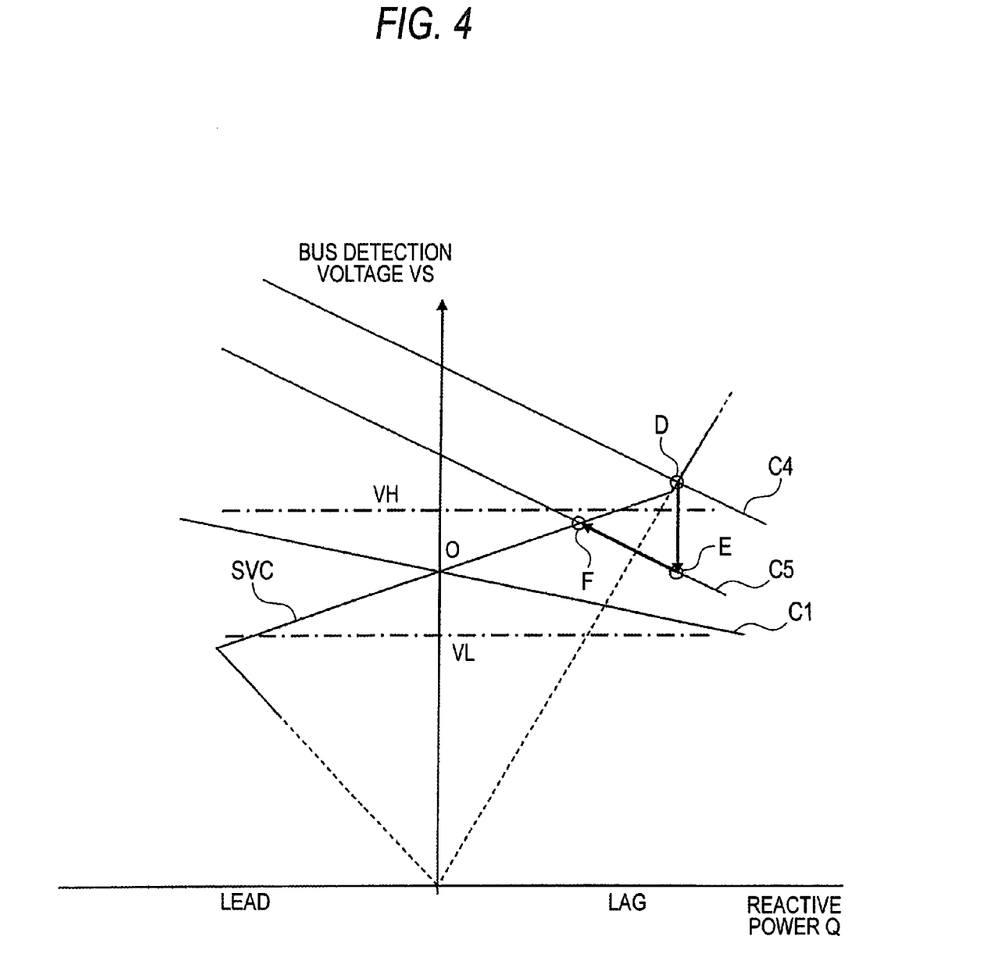
FIG. 4 is a diagram for explaining the operation of Embodiment 1 as employs the voltage versus reactive power characteristic of the reactive power compensation device in the case where the voltage rise abnormality of the AC power system has occurred.

Subsequently, if the voltage rise abnormality occurs in the recovery process after the clearing of the voltage drop abnormality of the AC power system 10, and the voltage level of the bus detection voltage VSR after the clearing of the voltage drop abnormality rises to, at least, the threshold value VH, that is, VSR≧VH holds, then the opening condition indicated at (b) in FIG. 2 is satisfied. Therefore, even if the compensation capacitor 41 is in the closed status, it is forcibly opened from the system bus 11. When the voltage level of the bus detection voltage VSR after the clearing of the voltage drop abnormality becomes equal to or greater than the threshold value VH of the second comparison means 113, the output of the second comparison means 113 becomes the high level, and the flip-flop 115 is forcibly brought into the reset status to bring the opening command Ioff to the high level. Therefore, the compensation capacitor 41 is opened from the system bus 11, to lower the AC voltage v of the system bus 11 and to lower the operating point of the reactive power compensation device 20, whereby the AC voltage v of the system bus 11 is stabilized. FIG. 4 is a characteristic diagram showing the relationship between the bus detection voltage VS and the reactive power Q of the system bus 11 as corresponds to the voltage rise abnormality.

In FIG. 4, the axis of ordinates represents the same bus detection voltage VS as in FIG. 3, while the axis of abscissas represents the same reactive power Q as in FIG. 3. A characteristic SVC and a characteristic C1 are also the same as in FIG. 3. A characteristic C4 is the characteristic of the reactive power Q corresponding to the bus detection voltage VS of the AC power system 10 in the case where the AC power system 10 has become the voltage rise abnormality.

Let's assume a case where the compensation capacitor 41 was closed to the system bus 11 after the clearing of the voltage drop abnormality, and where the voltage rise abnormality has occurred in the AC power system 10 in the process of the recovery of the AC voltage v of the system bus 11, so that the reactive power characteristic of the AC power system 10 has changed from the characteristic C1 to the characteristic C4. In this case, the operating point of the reactive power compensation device 20 shifts to an operating point D. The operating point D is the intersection point between the characteristic SVC and the characteristic C4, the bus detection voltage VS at the operating point D is greater than the threshold voltage VH, and the bus detection voltage VSR after the clearing of the voltage drop abnormality becomes VSR≧VH. Therefore, the output of the second comparison means 113 becomes the high level, the flip-flop 115 is forcibly brought into the reset status to bring its output Q2 to the high level, and the opening command Ioff becomes the high level to turn OFF the switch device 42, whereby the compensation capacitor 41 is opened from the system bus 11.

Owing to the opening of the compensation capacitor 41 from the system bus 11, the bus detection voltage VS of the bus system 11 lowers down to a point E, and the reactive power characteristic of the AC power system 10 changes from the characteristic C4 to a characteristic C5, so that the operating point of the reactive power compensation device 20 shifts from the operating point D to an operating point F. The operating point F is the intersection point between the characteristic SVC and the characteristic C5, and the bus detection voltage VS of the operating point F is less than the threshold value VH and greater than the threshold value VL. In this manner, in the case where the voltage rise abnormality of the AC power system 10 is cleared, the characteristic SVC of the reactive power compensation device 20 and the threshold value VH are caused to collaborate, and the compensation capacitor 41 is opened from the system bus 11, whereby the bus detection voltage VS of the system bus 11 is controlled to a value which is between the threshold value VL and the threshold value VH.

If the voltage rise abnormality does not occur in the recovery process after the clearing of the voltage drop abnormality, and the bus detection voltage VSR after the clearing of the voltage drop abnormality is confined within the range of VL≦VSR<VH, then the flip-flop 115 maintains the set status, and the status where the compensation capacitor 41 is closed to the system bus 11 is maintained.

As described above, in Embodiment 1, the compensation capacitor control circuit 100 includes the detection voltage output means 103 for outputting the bus detection voltage VSR after the clearing of the voltage drop abnormality, corresponding to the AC voltage v of the system bus 11 after the clearing of the voltage drop abnormality of the system bus 11, and the compensation capacitor control circuit 110 which controls the connection status of the compensation capacitor 41 with respect to the system bus 11, wherein the compensation capacitor control circuit 110 controls the connection status of the compensation capacitor 41 with respect to the system bus 11, in accordance with the voltage level of the bus detection voltage VSR after the clearing of the voltage drop abnormality, so that in spite of the small capacity of the reactive power compensation device 20, the reactive power control can be performed to control the AC voltage v of the system bus 11.

Embodiment 2

Figure 5:
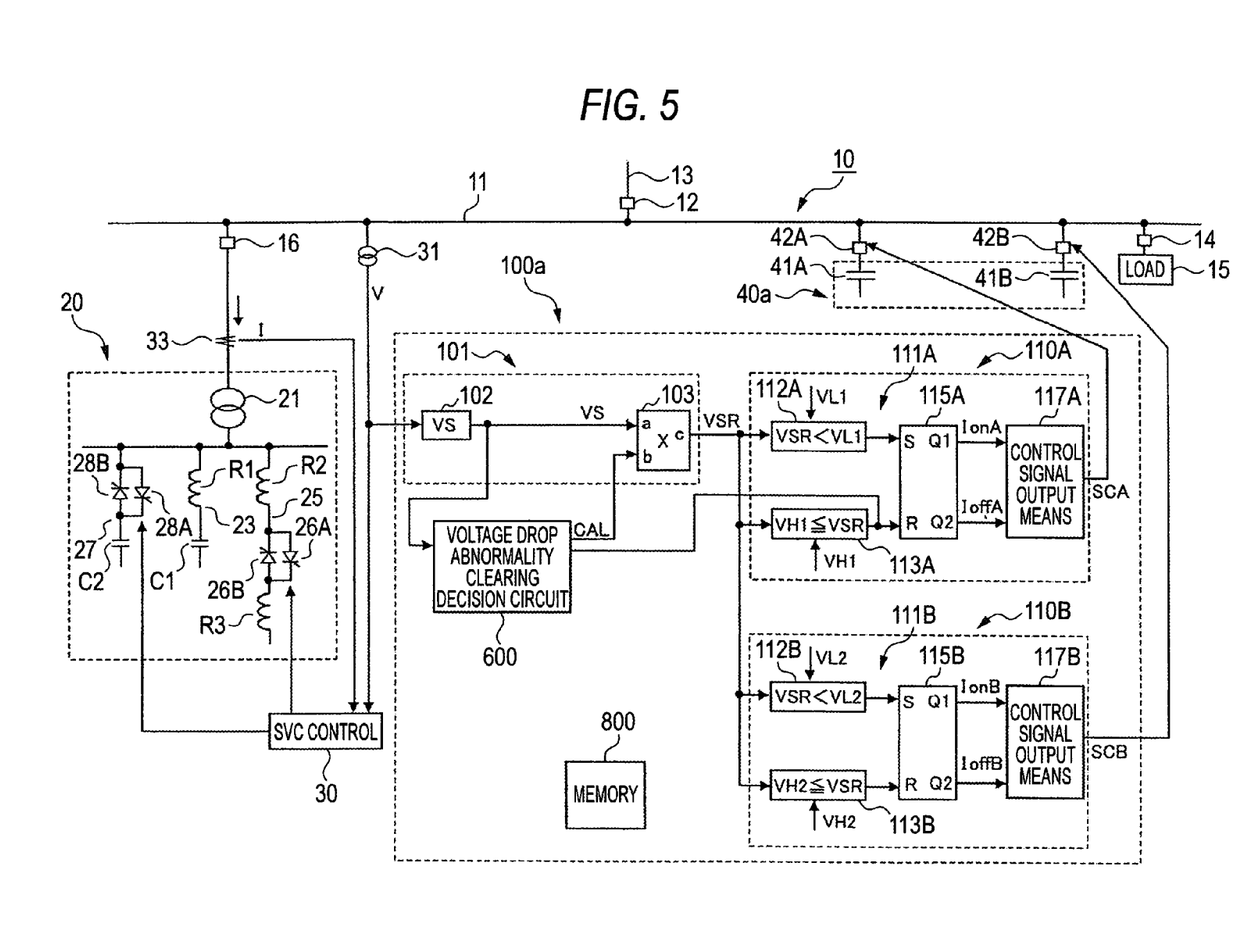
FIG. 5 is a configurational diagram showing Embodiment 2 of the reactive power control apparatus for the AC power system according to this invention.

FIG. 5 is a configurational diagram showing Embodiment 2 of the reactive power control apparatus for the AC power system according to this invention. In this embodiment 2, the compensation capacitor device 40 in Embodiment 1 is replaced with a compensation capacitor device 40a, and the compensation capacitor control device 100 in Embodiment 1 is replaced with a compensation capacitor control device 100a. The compensation capacitor control device 40a includes two compensation capacitors 41A and 41B, and these compensation capacitors 41A and 41B are respectively connected to a system bus 11 through switch devices 42A and 42B. Besides, the compensation capacitor control device 100a includes the same bus detection voltage output means 101, voltage drop abnormality clearing decision circuit 600 and memory 800 as in Embodiment 1, and also a compensation capacitor control circuit 110A for the compensation capacitor 41A, and a compensation capacitor control circuit 110B for the compensation capacitor 41B. The other construction is the same as in Embodiment 1.

Typically, each of the switch devices 42A and 42B of the compensation capacitor device 40a is constructed by using a mechanical circuit breaker having a switch contact. The mechanical circuit breaker can be constructed less expensively as compared with a semiconductor switch. The mechanical circuit breakers constructing the switch devices 42A and 42B have their switch contacts turned ON and OFF, thereby to close and open the respectively corresponding compensation capacitors 41A and 41B to and from the system bus 11. Incidentally, the switch devices 42A and 42B can also be constructed by using the semiconductor switches, for example, thyristors.

The compensation capacitor control circuit 110A for the compensation capacitor 41A includes a comparison circuit 111A, a flip-flop 115A and control signal output means 117A, and the comparison circuit 111A includes first and second comparison means 112A and 113A. Besides, the compensation capacitor control circuit 110B for the compensation capacitor 41B includes a comparison circuit 111B, a flip-flop 115B and control signal output means 117B, and the comparison circuit 111B includes first and second comparison means 112B and 113B. A threshold value VL1 and a threshold value VH1 are respectively set in the first comparison means 112A and second comparison means 113A of the comparison circuit 111A from the memory 800. A threshold value VL2 and a threshold value VH2 are respectively set in the first comparison means 112B and second comparison means 113B of the comparison circuit 111B from the memory 800. The threshold values VL1, VL2, VH1 and VH2 are set so as to have the relation of VL2<VL1<VH2<TH1. Incidentally, also in Embodiment 2, the flip-flops 115A and 115B are brought into reset statuses in their initial statuses.

Except the settings of the threshold values VL1, VL2, VH1 and V112, each of the comparison circuits 111A and 111B is endowed with the same configuration as that of the comparison circuit 111 in Embodiment 1. Besides, each of the flip-flops 115A and 115B is endowed with the same configuration as that of the flip-flop 115 in Embodiment 1. The output Q1 of the flip-flop 115A is used as a closing command IonA, and the output Q2 thereof as an opening command IoffA. Besides, the output Q1 of the flip-flop 115B is used as a closing command IonB, and the output Q2 thereof as an opening command IoffB. Each of the control signal output means 117A and 117B is endowed with the same configuration as that of the control signal output means 117 in Embodiment 1. The output of the control signal output means 117A is used as a control signal SCA, and the output of the control signal output means 117B as a control signal SCB.

The voltage drop abnormality clearing decision circuit 600 in Embodiment 2 is the same as in Embodiment 1, and the details thereof are omitted from illustration. Both the reset inputs R of the flip-flops 602 and 607 of the decision circuit 600 are connected to the output of the second comparison means 113A of the comparison circuit 111A in the compensation capacitor control circuit 110A.

Figure 6:
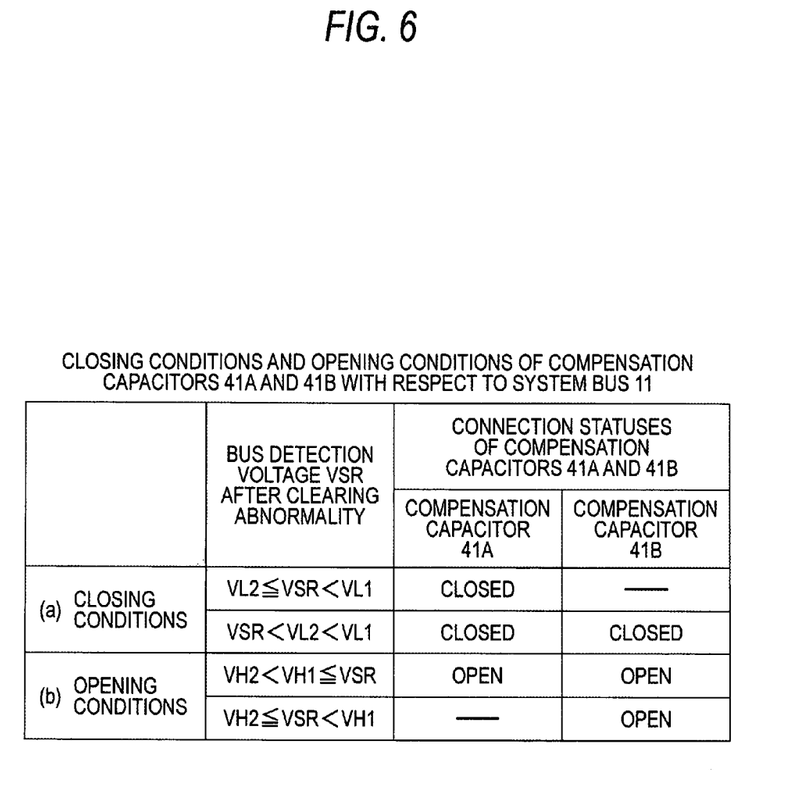
FIG. 6 is a table for explaining the operation of Embodiment 2, showing the closing conditions and opening conditions of individual compensation capacitors with respect to a system bus.

FIG. 6 is a table for explaining the operation of Embodiment 2, showing the closing conditions and opening conditions of the respective compensation capacitors 41A and 41B with respect to the system bus 11. (a) in FIG. 6 indicates the closing conditions of the compensation capacitors 41A and 41B with respect to the system bus 11, while (b) in FIG. 6 indicates the opening conditions of the compensation capacitors 41A and 41B with respect to the system bus 11.

First, regarding a case where the voltage drop abnormality in the AC power system 10 has been cleared, when the initial voltage level of the bus detection voltage VSR after the clearing of the voltage drop abnormality is less than the threshold value VL2, that is, VSR<VL2<VL1 holds, both the compensation capacitors 41A and 41B are closed to the system bus 11, as indicated at (a) in FIG. 6. This initial voltage level of the bus detection voltage VSR after the clearing of the voltage drop abnormality is equal to the bus detection voltage VS at the time when the voltage drop abnormality clearing signal CAL has changed from the level "0" to the level "1". When the initial voltage level of the bus detection voltage VSR after the clearing of the voltage drop abnormality is less than the threshold value VL2 of the first comparison means 112B, the output of the first comparison means 112B of the compensation capacitor control circuit 110B becomes the high level, to forcibly bring the flip-flop 115B into the set status and to bring the closing command IonB to the high level, so that the compensation capacitor 41B is closed to the system bus 11 by the control signal SCB. Besides, on this occasion, the initial voltage level of the bus detection voltage VSR after the clearing of the voltage drop abnormality is less than the threshold value VL1 of the first comparison means 112A. Therefore, also the output of the first comparison means 112A of the compensation capacitor control circuit 110A becomes the high level, to forcibly bring the flip-flop 115A into the set status and to bring the closing command IonA to the high level, so that the compensation capacitor 41A is also closed to the system bus 11 by the control signal SCA.

The closures of the compensation capacitors 41A and 41B are effected by the collaboration between the characteristic SVC based on the reactive power compensation device 20 and the threshold values VL1 and VL2, in the same manner as in FIG. 3. Owing to the closures of the compensation capacitors 41A and 41B, the AC voltage v of the system bus 11 rises to heighten the operating point of the reactive power compensation device 20 above the threshold value VL1, whereby the AC voltage v of the system bus 11 is stabilized.

In a case where the initial voltage level of the bus detection voltage VSR after the clearing of the voltage drop abnormality meets VL2≦VSR<VL1, the output of the first comparison means 112A of the compensation capacitor control circuit 110A becomes the high level, but the output of the first comparison means 112B of the compensation capacitor control circuit 110B becomes the low level. Therefore, the flip-flop 115A is forcibly brought into the set status, but the flip-flop 115B maintains the reset status. As a result, the compensation capacitor 41A is closed to the system bus 11. Since the flip-flop 115B maintains the reset status, the compensation capacitor 41B maintains its status opened from the system bus 11. The closure of the compensation capacitor 41A is effected by the collaboration between the characteristic SVC based on the reactive power compensation device 20 and the threshold values VL1 and VL2, in the same manner as in FIG. 3. Owing to the closure of the compensation capacitor 41A, the AC voltage v of the system bus 11 rises to heighten the operating point of the reactive power compensation device 20 above the threshold value VL1, whereby the AC voltage v of the system bus 11 is stabilized.

In this manner, in the case where the voltage drop abnormality has been cleared, both the compensation capacitors 41A and 41B are closed to the system bus 11 if VSR<VL2<VL1 holds, and the compensation capacitor 41A is closed to the system bus 11 if VL2≦VSR<VL1 holds, in correspondence with the initial voltage level of the bus detection voltage VSR after the clearing of the voltage drop abnormality and by causing the characteristic SVC of the reactive power compensation device 20 and the threshold values VL1 and VL2 to collaborate, whereby the bus detection voltage VS of the system bus 11 is controlled to a value which is between the threshold value VL1 and the threshold value VH2.

Subsequently, if the voltage rise abnormality occurs in the recovery process after the clearing of the voltage drop abnormality of the AC power system 10, and the voltage level of the bus detection voltage VSR after the clearing of the voltage drop abnormality rises to, at least, the threshold value VH1, that is, VH2<VH1≦VSR holds, then the opening condition indicated at (b) in FIG. 6 is satisfied. Therefore, even if the compensation capacitors 41A and 41B are in the closed statuses, they are forcibly opened from the bus system 11. In the recovery process after the clearing of the voltage drop abnormality, when the voltage level of the bus detection voltage VSR after the clearing of the voltage drop abnormality has become, at least, the threshold value VH1 of the first comparison means 113A, to establish VH2<VH1≦VSR, the output of the second comparison means 113A of the compensation capacitor control circuit 110A becomes the high level, to forcibly bring the flip-flop 115A into the reset status and to bring the opening command IoffA to the high level, so that the compensation capacitor 41A is forcibly opened from the system bus 11 by the control signal SCA. Besides, on this occasion, the voltage level of the bus detection voltage VSR after the clearing of the voltage drop abnormality is greater than the threshold value VH2 of the second comparison means 113B. Therefore, also the output of the second comparison means 113B of the compensation capacitor control circuit 110B becomes the high level, to forcibly bring the flip-flop 115B into the reset status and to bring the opening command IoffB to the high level, so that the compensation capacitor 41B is also forcibly opened from the system bus 11 by the control signal SCB.

The openings of the compensation capacitors 41A and 41B are effected by the collaboration between the characteristic SVC based on the reactive power compensation device 20 and the threshold values VH1 and VH2, in the same manner as in FIG. 4. Owing to the openings of the compensation capacitors 41A and 41B, the AC voltage v of the system bus 11 lowers to lower the operating point of the reactive power compensation device 20 below the threshold value VH2, whereby the AC voltage v of the system bus 11 is stabilized.

In a case where, even when the voltage rise abnormality has occurred in the recovery process after the clearing of the voltage drop abnormality, the bus detection voltage VSR after the clearing of the voltage drop abnormality rises only into the range of VH2≦VSR<VH1, the output of the second comparison means 113B of the compensation capacitor control circuit 110B becomes the high level, but the output of the second comparison means 113A of the compensation capacitor control circuit 110A becomes the low level. Therefore, the flip-flop 115B is forcibly brought into the reset status, but the flip-flop 115A maintains the set status. As a result, the compensation capacitor 41B has its opening condition satisfied as indicated at (b) in FIG. 6, and it is opened from the system bus 11, but the compensation capacitor 41A maintains the closed status. The opening of the compensation capacitor 41B is effected by the collaboration between the characteristic SVC based on the reactive power compensation device 20 and the threshold values VH1 and VH2, in the same manner as in FIG. 4. Owing to the opening of the compensation capacitor 41B, the AC voltage v of the system bus 11 lowers to lower the operating point of the reactive power compensation device 20 below the threshold value VH2, whereby the AC voltage v of the system bus 11 is stabilized.

If the voltage rise abnormality does not occur in the recovery process after the clearing of the voltage drop abnormality, and the bus detection voltage VSR after the clearing of the voltage drop abnormality is confined within the range of VSR<VH2<VH1, then both the outputs of the first comparison means 112A and 112B of the respective compensation capacitor control circuits 110A and 110B are at the low level, and both the flip-flops 115A and 115B maintain the set statuses, so that both the compensation capacitors 41A and 41B maintain their statuses closed to the system bus 11.

In this manner, in the case where the voltage rise abnormality has occurred in the recovery process after the clearing of the voltage drop abnormality, both the compensation capacitors 41A and 41B are forcibly opened from the system bus 11 if the bus detection voltage VSR after the clearing of the voltage drop abnormality rises into the range of VH2<VH1≦VSR, and the compensation capacitor 41B is forcibly opened from the system bus 11 if the voltage VSR rises only into the range of VH2≦VSR<VH1, in correspondence with the voltage level of the bus detection voltage VSR after the clearing of the voltage drop abnormality and by causing the characteristic SVC of the reactive power compensation device 20 and the threshold values VH1 and VH2 to collaborate, whereby the bus detection voltage VS of the system bus 11 is controlled to a value which is between the threshold value VL1 and the threshold value VH2.

As described above, in Embodiment 2, the compensation capacitor device 40a includes the compensation capacitors 41A and 41B, and the compensation capacitor control device 100a includes the compensation capacitor control circuit 110A for controlling the connection status of the compensation capacitor 41A with respect to the system bus 11, and the compensation capacitor control circuit 110B for controlling the connection status of the compensation capacitor 41B with respect to the system bus 11, wherein the compensation capacitor control circuits 110A and 110B control the connection statuses of the respective compensation capacitors 41A and 41B with respect to the system bus 11, on the basis of the voltage level of the bus detection voltage VSR after the clearing of the voltage drop abnormality, so that in spite of the small capacity of the reactive power compensation device 20, the reactive power control can be performed more finely than in Embodiment 1 so as to control the AC voltage v of the system bus 11.

Various modifications and alterations of this invention will be apparent to those skilled in the art without departing from the scope and spirit of this invention, and it should be understood that this invention is not limited to the illustrative embodiments set forth herein.

What is claimed is:

1. A reactive power control apparatus for an AC power system, wherein a reactive power compensation device, and a compensation capacitor device including at least one compensation capacitor are connected to a system bus of the AC power system, and reactive power is controlled in accordance with a fluctuation of an AC voltage of the system bus, comprising:

a compensation capacitor control device which controls a connection status of the compensation capacitor with respect to the system bus;

wherein said compensation capacitor control device includes:
a voltage drop abnormality clearing decision circuit which outputs a voltage drop abnormality clearing signal having one level after a voltage drop abnormality state of the AC power system has been cleared; and
a bus detection voltage output means for receiving the voltage drop abnormality clearing signal and for outputting a bus detection voltage after clearing of a voltage drop abnormality as corresponds to the AC voltage of the system bus on the basis of the voltage drop abnormality clearing signal having the one level, wherein the bus detection voltage, after clearing of the voltage drop abnormality, is varied according to the AC voltage of the system bus after that the voltage drop abnormality state of the AC power system has been cleared; and
a compensation capacitor control circuit which controls the connection status of the compensation capacitor with respect to the system bus on the basis of a voltage level of the bus detection voltage after the clearing of the voltage drop abnormality.

2. The reactive power control apparatus for the AC power system as defined in claim 1, wherein said compensation capacitor control circuit closes the compensation capacitor to the system bus when the voltage level of the bus detection voltage after the clearing of the voltage drop abnormality is less than a threshold value VL, and it opens the compensation capacitor from the system bus when the voltage level of the bus detection voltage after the clearing of the voltage drop abnormality has become, at least, a threshold value VH (VH>VL).

3. The reactive power control apparatus for the AC power system as defined in claim 2, wherein said compensation capacitor control device is constructed by using a computer, and the threshold values VL and VH are retained in a memory of said computer.

4. The reactive power control apparatus for the AC power system as defined in claim 2, wherein said compensation capacitor control device controls the connection status of the compensation capacitor with respect to the system bus, by causing an AC voltage/reactive power characteristic of the reactive power compensation device and the threshold values VL and VH to collaborate.

5. The reactive power control apparatus for the AC power system as defined in claim 1, wherein the compensation capacitor device includes first and second compensation capacitors, and said compensation capacitor control device includes a first compensation capacitor control circuit which controls a connection status of the first compensation capacitor with respect to the system bus, and a second compensation capacitor control circuit which controls a connection status of the second compensation capacitor with respect to the system bus, wherein the first and second compensation capacitor control circuits control the connection statuses of said first and second compensation capacitors with respect to the system bus, on the basis of the voltage level of the bus detection voltage after the clearing of the voltage drop abnormality, respectively.

6. The reactive power control apparatus for the AC power system as defined in claim 5, wherein said first compensation capacitor control circuit closes said first compensation capacitor to the system bus when the voltage level of the bus detection voltage after the clearing of the voltage drop abnormality is less than a threshold value VL1, while said second compensation capacitor control circuit closes said second compensation capacitor to the system bus when the voltage level of the bus detection voltage after the clearing of the voltage drop abnormality is less than a threshold value VL2 (VL2<VL1), and
wherein said first compensation capacitor control circuit opens said first compensation capacitor from the system bus when the voltage level of the bus detection voltage after the clearing of the voltage drop abnormality has become, at least, a threshold value VH1 (VH1>VL1), while said second compensation capacitor control circuit opens said second compensation capacitor from the system bus when the voltage level of the bus detection voltage after the clearing of the voltage drop abnormality has become, at least, a threshold value VH2 (VL2<VH2<VH1).

7. The reactive power control apparatus for the AC power system as defined in claim 6, wherein said compensation capacitor control device is constructed by using a computer, and the threshold values VL1, VL2, VH1 and VH2 are retained in a memory of said computer.

8. The reactive power control apparatus for the AC power system as defined in claim 6, wherein said compensation capacitor control device controls the connection statuses of the compensation capacitors with respect to the system bus, by causing an AC voltage/reactive power characteristic of the reactive power compensation device and the threshold values VL1, VL2, VH1 and VH2 to collaborate.

9. The reactive power control apparatus for the AC power system as defined in claim 1, wherein the reactive power compensation device is a static type reactive power compensation device, and said static type reactive power compensation device controls reactive power which is to be fed to the system bus, by controlling semiconductor switches.

10. The reactive power control apparatus for the AC power system as defined in claim 1, wherein a switch device having a switch contact is connected between the system bus and the compensation capacitor, and the switch contact is turned ON and OFF by said compensation capacitor control circuit, thereby to close and open the compensation capacitor to and from the system bus, respectively.

* * * * *